US006460100B1

(12) United States Patent
Arimilli et al.

(10) Patent No.: US 6,460,100 B1
(45) Date of Patent: Oct. 1, 2002

(54) BUS SNOOPER FOR SMP EXECUTION OF GLOBAL OPERATIONS UTILIZING A SINGLE TOKEN WITH IMPLIED RELEASE

(75) Inventors: Ravi Kumar Arimilli, Austin; John Steven Dodson, Pflugerville; Jody B. Joyner, Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,929

(22) Filed: Nov. 9, 1999

(51) Int. Cl.⁷ .............................. G06F 13/14; G06F 9/50
(52) U.S. Cl. ...................... 710/105; 710/107; 709/100; 370/450
(58) Field of Search .......................... 710/105, 40, 110, 710/5, 240, 107; 709/100, 201, 209; 712/30, 31, 220; 370/450

(56) References Cited

U.S. PATENT DOCUMENTS

| | | |
|---|---|---|
| 4,870,704 A | 9/1989 | Matelan et al. |
| 5,568,620 A | 10/1996 | Sarangdhar et al. |
| 5,682,512 A | 10/1997 | Tetrick |
| 5,761,734 A * | 6/1998 | Pfeffer et al. |
| 5,774,700 A | 6/1998 | Fisch et al. |
| 5,852,747 A * | 12/1998 | Bennett et al. |
| 5,903,738 A | 5/1999 | Sarangdhar et al. |
| 6,079,013 A * | 6/2000 | Webb et al. |
| 6,119,219 A * | 9/2000 | Webb et al. |
| 6,141,743 A * | 10/2000 | Strongin |

* cited by examiner

Primary Examiner—Gopal C. Ray
(74) Attorney, Agent, or Firm—Casimer K. Salys; Bracewell & Patterson, L.L.P.

(57) ABSTRACT

Only a single snooper queue for global operations within a multiprocessor system is implemented within each bus snooper, controlled by a single token allowing completion of one operation. A bus snooper, upon detecting a combined token and operation request, begins speculatively processing the operation if the snooper is not already busy. The snooper then watches for a combined response acknowledging the combined request or a subsequent token request from the same processor, which indicates that the originating processor has been granted the sole token for completing global operations, before completing the operation. When processing an operation from a combined request and detecting an operation request (only) from a different processor, which indicates that another processor has been granted the token, the snooper suspends processing of the current operation and begins processing the new operation. If the snooper is busy when a combined request is received, the snooper retries the operation portion of the combined request and, upon detecting a subsequent operation request (only) for the operation, begins processing the operation at that time if not busy. Snoop logic for large multiprocessor systems is thus simplified, with conflict reduced to situations in which multiple processors are competing for the token.

19 Claims, 7 Drawing Sheets

BUS SNOOPER FOR SMP EXECUTION OF GLOBAL OPERATIONS UTILIZING A SINGLE TOKEN WITH IMPLIED RELEASE

RELATED APPLICATIONS

The present invention is related to the subject matter of commonly assigned, copending U.S. patent applications: Ser. No. 09/435,925 entitled "BUS MASTER FOR SMP EXECUTION OF GLOBAL OPERATIONS UTILIZING A SINGLE TOKEN WITH IMPLIED RELEASE"; Ser. No. 09/436,928 entitled "BUS PROTOCOL AND TOKEN MANAGER FOR SMP EXECUTION OF GLOBAL OPERATIONS UTILIZING A SINGLE TOKEN WITH IMPLIED RELEASE"; Ser. No. 09/435,928 entitled "BUS MASTER AND BUS SNOOPER FOR EXECUTION OF GLOBAL OPERATIONS UTILIZING A SINGLE TOKEN FOR MULTIPLE OPERATIONS WITH EXPLICIT RELEASE"; Ser. No. 09/435,924 entitled "BUS PROTOCOL AND TOKEN MANAGER FOR EXECUTION OF GLOBAL OPERATIONS UTILIZING A SINGLE TOKEN FOR MULTIPLE OPERATIONS WITH EXPLICIT RELEASE"; Ser. No. 09/435,927 entitled "BUS PROTOCOL, BUS MASTER AND BUS SNOOPER FOR EXECUTION OF GLOBAL OPERATIONS UTILIZING MULTIPLE TOKENS"; and Ser. No. 09/435,929 entitled "TOKEN MANAGER FOR EXECUTION OF GLOBAL OPERATIONS UTILIZING MULTIPLE TOKENS". The content of the above-identified applications are incorporated herein by reference.

BACKGROUND OF THE INVENTION

1. Technical Field

The present invention generally relates to processing of global operations in multiprocessor systems and in particular to employing tokens to permit speculative execution of global operations within multiprocessor systems. Still more particularly, the present invention relates to implementing a bus snooper employing tokens for speculative execution of global operations within a multi-processor system.

2. Description of the Related Art

Many operations performed within multiprocessor systems may be executed locally by a single processor without immediately involving or affecting other processors within the system. For example, a processor may write a modified cache line to a local cache without making the write operation immediately visible to all other processors. A write-back of the modified data to system memory may be deferred until a later time or combined, through a modified intervention, with a subsequent read operation by a different processor for the same cache line.

However, processors within multiprocessor systems periodically execute operations which must be globally visible to all other processors within the system. By their nature, these operations require the involvement of all other processors. For example, within the PowerPC architecture, a processor may execute an instruction cache clock invalidate (ICBI), translation lookaside buffer invalidate (TLBI), or synchronization (SYNCH) operation. A synchronizing operation, for instance, may be employed to allow prior instructions within an instruction stream executing on a pipelined, out-of-order multiprocessor system to complete before performing a context switch.

Existing designs for multiprocessor systems support global operations by implementing a queue for such operations within each processor for every other processor within the system. That is, a processor within a system havign three other processors will include three queues for snooping global operations. The depth of each snoop queue will equal the latency of the combined response in order to prevent system livelocks. Thus, where a system requires five bus cycles to generate a combined response to an address transaction, the global operation queues will have a pipeline which is five levels deep.

This approach to supporting global operations is extremely hardware intensive and is not scalable. As the operating frequency and the number of processors within a system increases, driving the latency of a combined response up to close to 100 cycles, the approach described above becomes unwieldy. As the window for the combined response becomes larger, snooper implementations become more complex and costly.

It would be desirable, therefore, to to broadcst global operations in a highly scalable multiprocessor system while keeping masters and snoopers as simple as possible but also preventing system livelocks. It would also be desirable to decouple the depth of snoop queues from the width of address to combined response windows, and to maintain high frequency oepration while increasing the number of processor in a system supporting global operations.

SUMMARY OF THE INVENTION

It is therefore one object of the present invention to provide improved processing of global operations in multiprocessor systems.

It is another object of the present invention to provide a mechanism for employing tokens to permit speculative execution of global operations within multiprocessor systems.

It is yet another object of the present invention to provide a bus snooper employing tokens for speculative execution of global operations within a multiprocessor system.

The foregoing objects are achieved as is now described. Only a single snooper queue for global operations within a multiprocessor system is implemented within each bus snooper, controlled by a single token allowing completion of one operation. A bus snooper, upon detecting a combined token and operation request, begins speculatively processing the operation if the snooper is not already busy. The snooper then watches for a combined response acknowledging the combined request or a subsequent token request from the same processor, which indicates that the originating processor has been granted the sole token for completing global operations, before completing the operation. When processing an operation from a combined request and detecting an operation request (only) from a different processor, which indicates that another processor has been granted the token, the snooper suspends processing of the current operation and begins processing the new operation. If the snooper is busy when a combined request is received, the snooper retries the operation portion of the combined request and, upon detecting a subsequent operation request (only) for the operation, begins processing the operation at that time if not busy. Snoop logic for large multiprocessor systems is thus simplified, with conflict reduced to situations in which multiple processors are competing for the token.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
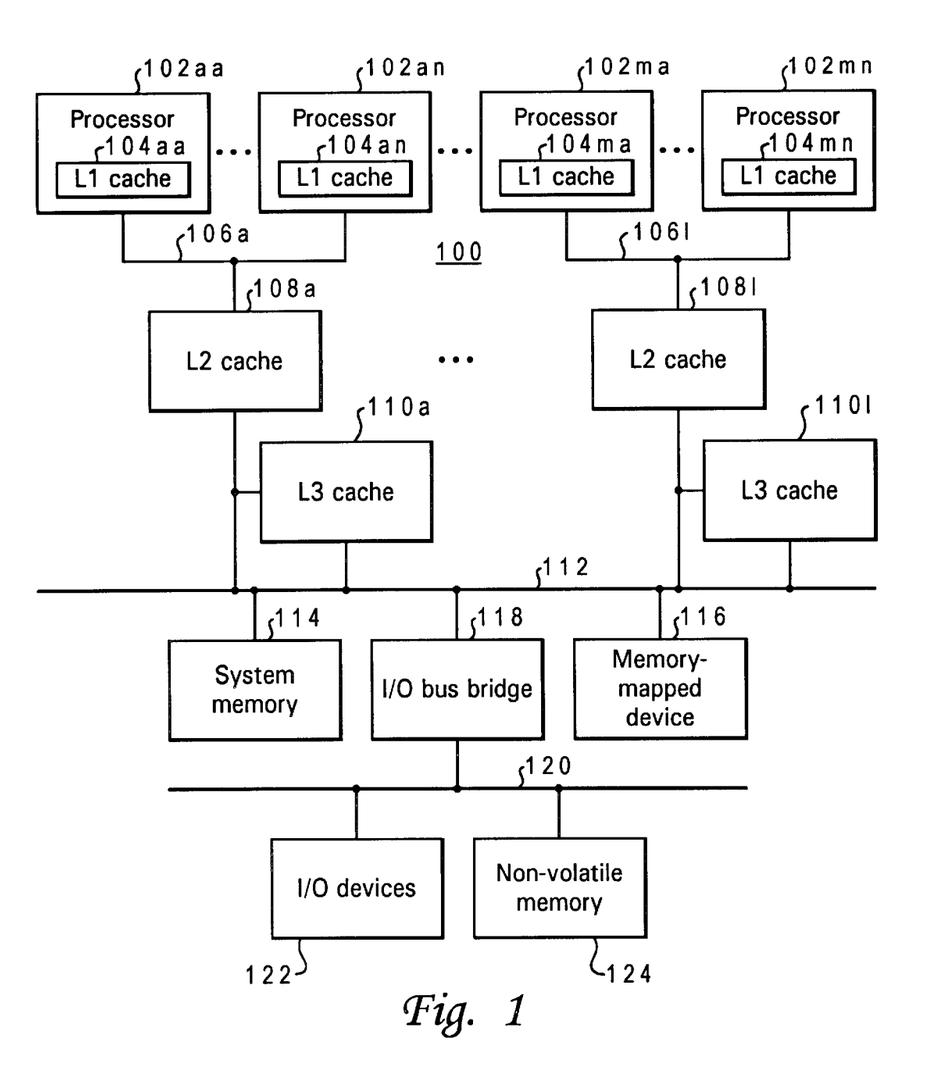
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102aa through 102an and 102ma through 102mn (where "m" and "n" are integer-valued variables). Each processor 102aa–102mn includes a respective level one (L1) cache 104aa–104mn, preferably on chip with the processor and bifurcated into separate instruction and data caches. Each processor 102aa–102mn is coupled via a processor bus 106aa–106l to a level two cache 108a–108l (where "1" is an integer-valued variable), which are in-line caches shared by multiple processors in the exemplary embodiment.

Although in the exemplary embodiment only two processors are depicted as sharing each L2 cache, and only two L2 caches are depicted, those skilled in the art will appreciate that additional processors and L2 caches may be utilized in a multiprocessor data processing system in accordance with the present invention. For example, each L2 cache may be shared by four processors, and a total of sixteen L2 caches may be provided.

Each L2 cache 108a–108l is connected to a level three (L3) cache 110a–110l and to system bus 112. L3 caches 110a–110l are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108l and L3 caches 110a–110l—are employed to stage data to the L1 caches 104a–104l and typically have progressively larger storage capacities but longer access latencies. L2 caches 108a–108l and L3 caches 110a–110l thus serve as intermediate storage between processors 102aa–102mn and system memory 114, which typically has a much larger storage capacity but may have an access latency many times that of L3 caches 110a–110l. Both the number of levels in the cache hierarchy and the cache hierarchy configuration (i.e, shared versus private, in-line versus lookaside) employed in data processing system 100 may vary.

L2 caches 108a–108l and L3 caches 110a–110l are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Each processor 102aa–102mn may initiate operations which must be globally visible within data processing system 100. A processor initiating such an operations will begin a bus transaction on a corresponding processor bus to an L2 cache, which will in turn begin a corresponding system bus transaction on system bus 112. Other L2 caches not sharing a common processor bus with the processor initiating the operation will snoop the operation off the system bus 112 and initiate a correpsonding bus transaction on the respective processor bus coupled to the L2 cache. The global operation is performed as described in further detail below.

Figure 2:
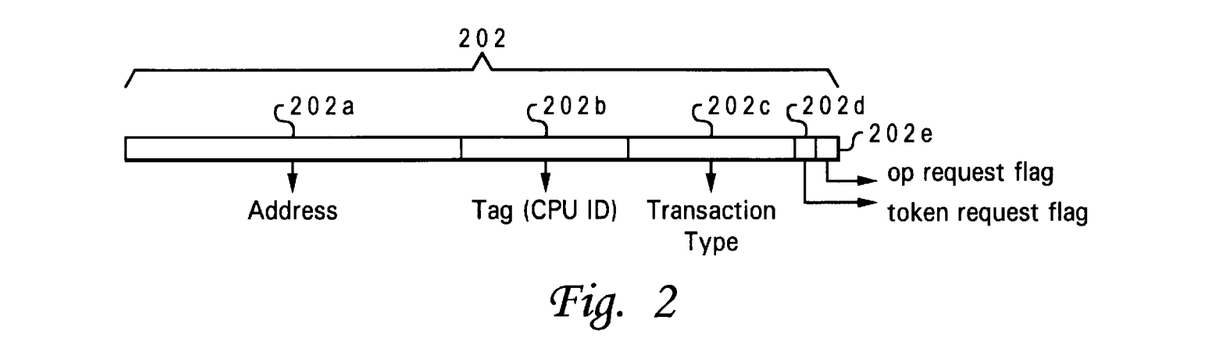
FIG. 2 is an address bus transaction data structure employed for global operations within a multiprocessor system in accordance with a preferred embodiment of the present invention.

Referring to FIG. 2, an address bus transaction data structure employed for global operations within a multiprocessor system in accordance with a preferred embodiment of the present invention is illustrated. Address bus transaction data structure 202 iillustrates the token bus protocol address/response definitions for a system supporting only one global operation per token. Address bus transaction data structure 202, which is employed on the processor and system address buses for global operations, includes: an address 202a for the target of the operation, if any; a tag 202b including a processor identifier for the processor within the system which initiates the operation; a transaction type identifier 202c designating the type of operation being initiated (i.e., ICBI, TLBI, etc.); a token request flag 202d; and an operation request flag 202e.

The present invention employs a token to prevent system livelocks by conflicting global operations. Each device within the storage hierarchy which is capable of initiating a global operation on a lower level bus (processors 102aa–102mn and L2 caches 108a–108l in the exemplary embodiment of FIG. 1) contains bus interface logic for driving address bus transaction data structure 202 and for receiving and appropriately reacting to the combined response, as well as snoop logic for detecting address bus transaction data structure 202 and for driving an appropriate snoop response. Each device within the storage hierarchy which receives global operations from a higher level bus (L2 caches 108a–108l, L3 caches 110a–110l, and system memory 114 in the exemplary embodiment of FIG. 1) contains bus interface logic for detecting address bus data structure 202 and for driving an appropriate response. Additionally, a token manager is implemented, typically integrated with the bus arbitration function in a bus controller.

A bus master must request and receive a token for a global operation from the token manager before the operation may be completed. If the token is not received by the bus master, the operation must be retried. The token manager controls granting of the token or tokens to prevent conflict between global operations, granting a token only when available (i.e., not currently being utilized) and refusing token requests until the appropriate token is released by a current owner. The token manager thus ensures serialization of global operations.

In the present invention, a token request is submitted with the address transaction data structure 202 initiating a global operation, so that a token required to perform the operation is requested simultaneously with an attempt to initiate the operation. This avoids the latency required to request and receive a token before issuing the operation, which may then be retried anyway. Such latency may be significant as the combined response window approaches 100 cycles in systems having many processors (e.g., 128-way SMP systems).

The token request flag 202d and the operation request flag 202e are employed to request initiation or completion of a global operation. The token request and the operation request may be made jointly or separately to allow completion of operations which were speculatively started but retried, as described below. The possible permutations of token request flag 202d and operation request flag 202e are detailed in Table I, where a flag state of "XY" indicates that token request flag 202d has the state "X" and the operation request flag has the state "Y". The significance of the combined flag states as an indicator of the type of request being made and the possible combined responses to each supported request are also listed.

TABLE I

| Flags | Request Type | Possible combined response |
| --- | --- | --- |
| 10 | Token request | retry or ack |
| 11 | Token + Op request | token ack/snoop retry<br>ack (token & snoop)<br>retry (token & snoop) |
| 01 | Op request | retry or ack |

As shown in Table I, a token request may be made alone, without an operation request, and an operation request may be made alone, without a token request, or a combined token and operation request may be made by a bus master. Normally a bus master initiating an operation for the first time will issue a combined token and operation request. The combined token and operation request minimizes latency as described above and allows speculative processing of the operation.

The combined token and operation request is limited to one time, attempted only the first time a particular global operation is initiated (i.e., not attempted when a global operation is being retried). Subsequent attempts to initiate a global operation utilize the token request (only) and operation request (only). However, the frequency of occurence of global operations on a system bus is very small compared to normal data transfer operations. As a result, serialization of global operations enforced by token protocol has no meaningful impact on overall system processing.

An operation request may be utilized by itself by a bus master where a previous combined token and operation request received a grant of the requested token but a snoop retry of the requested operation was asserted. However, a retry of a token request intrinsically implies a snoop retry (i.e., a combined response retrying the token request portion of a combined token and operation request while acknowledging the operation request portion of the combined request is not supported in order to prevent system livelocks). Speculative processing of an operation by snoopers can occur whenever a combined token and operation request is retried, although this speculative processing will have to be aborted if an operation request (only) is subsequently snooped. A token request (only) is unlikely to be utilized in the present invention unless more than one bus master is competing for the token at the same time.

When a combined token and operation request or an operation request (only) receives a combined response acknowledging the operation request, the combined response implies that the token has been released (all bus participants are performing the requested global operation) and is available for subsequent use by a bus master seeking to initiate a global operation.

With the single token, speculative processing system described, snoopers need only have a single, one-deep queue for global operations, greatly reducing and simplifying the hardware required to support global operations in large multiprocessor systems (e.g., 128-way SMP systems). By limiting the number of global operations per token to one, acknowledgement of an operation within the combined response implies release of the token.

Figure 3:
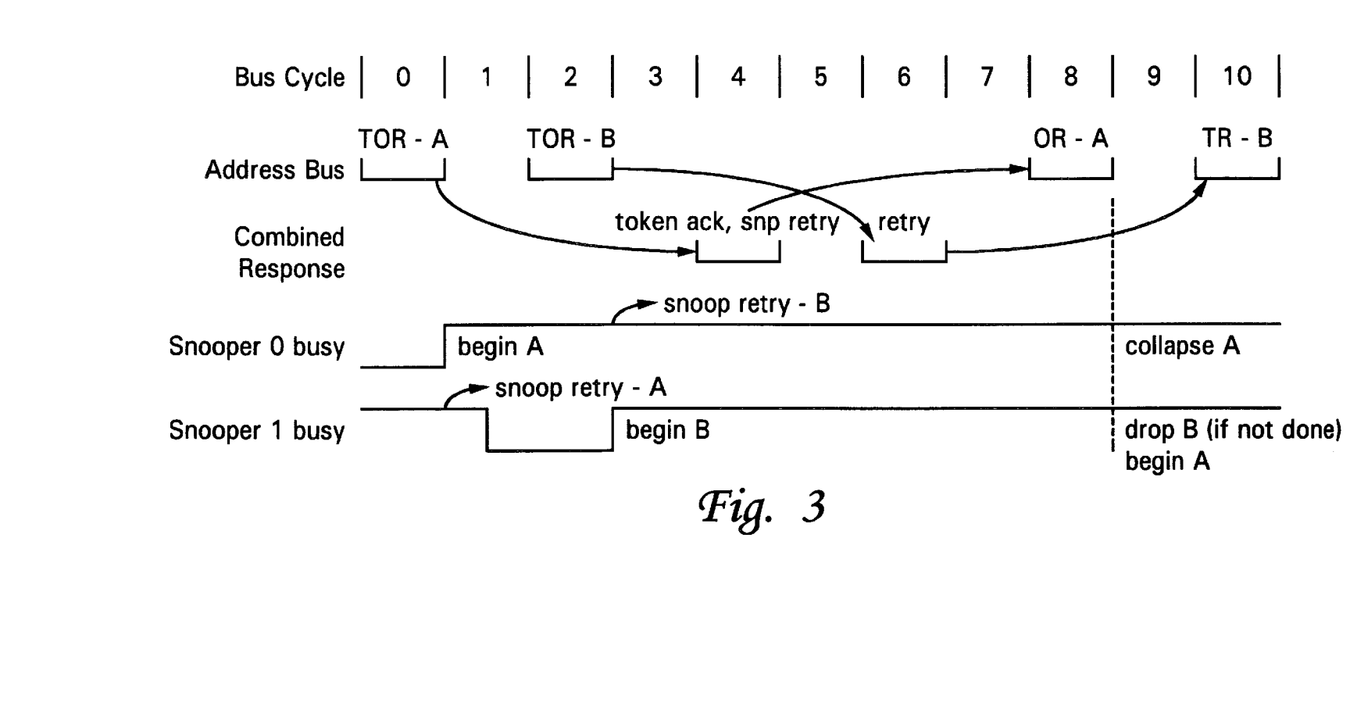
FIG. 3 depicts a timing diagram for a hypothetical sequence of global operations within a multiprocessor system in accordance with a preferred embodiment of the present invention.

With reference now to FIG. 3, a timing diagram for a hypothetical sequence of global operations within a multiprocessor system in accordance with a preferred embodiment of the present invention is depicted. The example depicted is for a single token bus protocol with speculative processing of operations, allowing only one operation per token. Within the example shown, which employs address bus transaction data structure 202 illustrated in FIG. 2 for initiating global operations, "TOR" designates a combined token and operation request, "TR" designates a token request (only), and "OR" designates an operation request (only).

In the example of FIG. 3, an address transaction for a combined token and operation request ("TOR—A") is driven on a bus during bus cycle 0. Snooper 0 is not busy with any other global operation and begins speculative processing of the operation requested by address transaction A. Snooper 1, however, is busy with a previous global operation and therefore transmits a retry snoop response to the combined request, which results in a combined response during bus cycle 4 (a four-cycle combined response window is assumed for this example) acknowledging (granting) the token request portion of address transaction A but retrying the operation request portion.

An address transaction for a different combined token and operation request ("TOR—B") is then driven on the bus (either by the same device which drove the address transaction for TOR—A or by a different device) during bus cycle 2. Snooper 0, now busy speculatively processing the operation requested in TOR—A, drives a retry snoop response. Snooper 1, having completed the earlier global operation during the cycles between TOR—A and TOR—B, begins speculative processing of the operation requested by TOR—B. Since the only existing token is checked out to the device initiating TOR—A, the token manager causes the combined response retrying both the token and operation request portions of TOR—B to be driven during bus cycle 6.

After receiving the combined response granting the token but retrying the operation during bus cycle 4, the device initiating TOR—A drives an address transaction for an operation request (only) ("OR—A") during bus cycle 8. Snooper 0, after comparing the processor identifier within the address transaction OR—A and recognizing the operation as the same previously requested during bus cycle 0, collapses the new operation request with the existing operation request already being speculatively performed in response to the address transaction TOR—A. Snooper 1 drops processing of the operation requested by address transaction TOR—B (if the operation is not completed), and begins processing the operation for address transaction OR—A.

When address transaction OR—A is detected, snooper 1 halts speculative processing of the operation requested by TOR—B because the only existing token for global operations is currently held by the device initiating address transaction TOR—A. Therefor, the device initiating address transaction TOR—B will not receive the token, and will be repeatedly retried, until the operation initiated by TOR—A is completed. If snooper 1 has completed processing of the operation requested by address transaction TOR—B, the result may be preserved rather than discarded to avoid duplication of work if the same operation is later requested and the token is granted to the requesting device.

In the example depicted in FIG. 3, the retry combined response to address transaction TOR—B causes a token request (only) ("TR—B") to be driven on the bus during bus cycle 10. The device initiating address transaction TOR—B must obtain the token (released when OP—A driven during bus cycle 8 is acknowledged in the combined response) and then receive an acknowledge combined response to an operation request (only) before that operation initiated by TOR—B may be considered complete.

To maintain consistency and prevent potential system livelocks, several constraints should be imposed on processing of combined token and operation requests and subsequent operation requests (only). If a snooper is processing a combined token and operation request and detects a subsequent operation request (only) from the same processor but with a different address, the snooper must retry the operation request (only) and continue processing the combined token and operation request. If a snooper is processing a combined token and operation request and detects a subsequent operation request (only) from a different processor (which implies that the other processor has been granted the token), the snooper suspends processing of the combined token and operation request and begins processing the new operation request (only).

Figure 4:
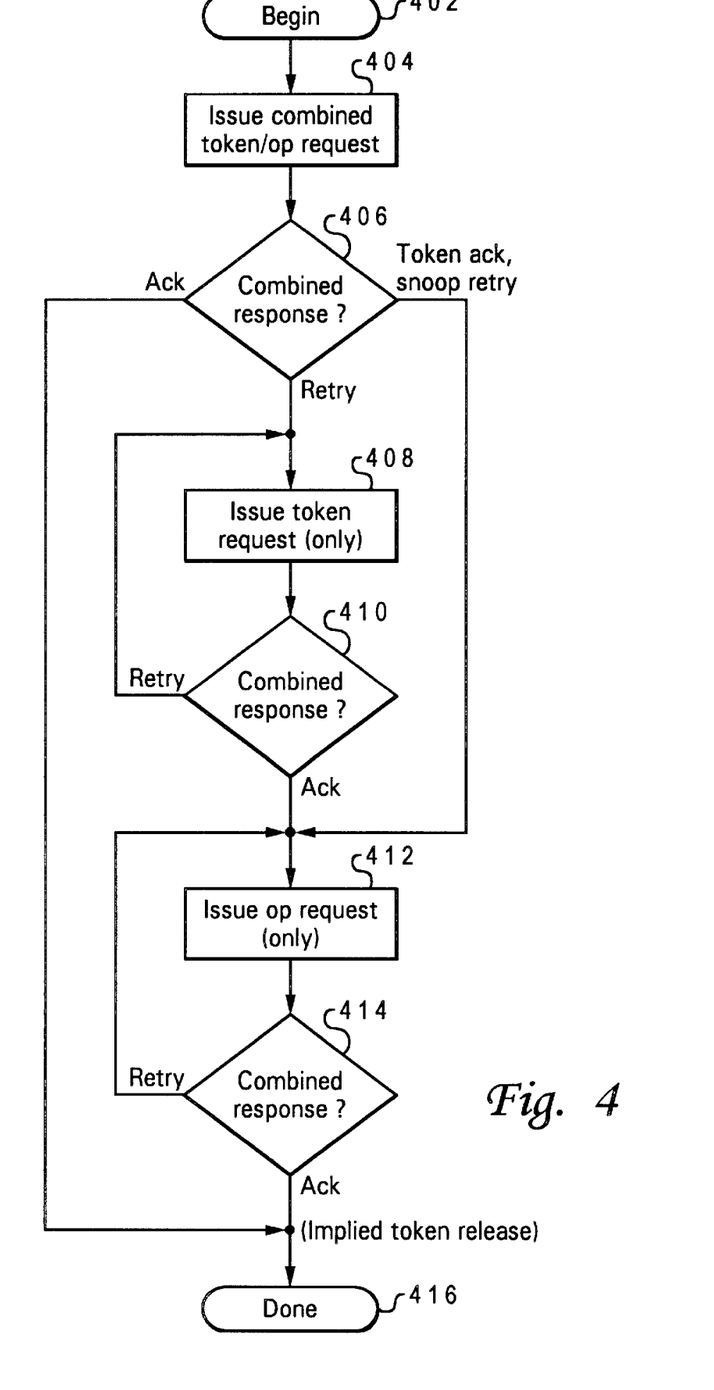
FIG. 4 is a high level flowchart for a process within a bus master of issuing global operations in a system employing a single token limited to one operation in accordance with a preferred embodiment of the present invention.

Referring to FIG. 4, a high level flow chart for a process within a bus master of issuing global operations in a system employing a single token limited to one operation in accordance with a preferred embodiment of the present invention is illustrated. This example and other examples herein relate to a system utilizing a single token and limiting the benefit of having the token to a single global operation, such that the token must be requested and received for each individual global operation.

The process begins at step 402, with a device (processor or cache) initiating a global operation on a bus within a system. The process first passes to step 404, which illustrates the initiating device issuing a combined token and operation request, then passes to step 406, which depicts a determination of what combined response is received for the combined token and operation request.

If a retry combined response is received, the process proceeds to step 408, which illustrates the initiating device issuing a token request (only) on the bus, and then to step 410, which depicts a determination of what combined response is received for the token request (only). If a retry response to the token request (only) is received, the process returns to step 408 and issues another token request (only). However, if an acknowledge response is received to the token request (only), the process proceeds to step 412, which illustrates issuing an operation request (only).

The process next passes to step 414, which depicts a determination of what combined response is received to the operation request (only). If a retry response to the operation request (only) is received, the process returns to step 412 and issues another operation request (only). However, if an acknowledge response is received to the token request (only), the process proceeds to step 416, with the process being complete.

Referring back to step 406, if a token acknowledge, operation retry response is received to the combined token and operation request, the process proceeds to step 412, in which the initiating device issues an operation request (only). If an acknowledge response is received to the combined token and operation request in step 406, however, the process proceeds instead directly to step 416. Receipt of an acknowledge to both portions of a combined token and operation request, or to a token request (only) as well as to an operation request (only), implies release of the token for a subsequent global operation.

Figure 5A:
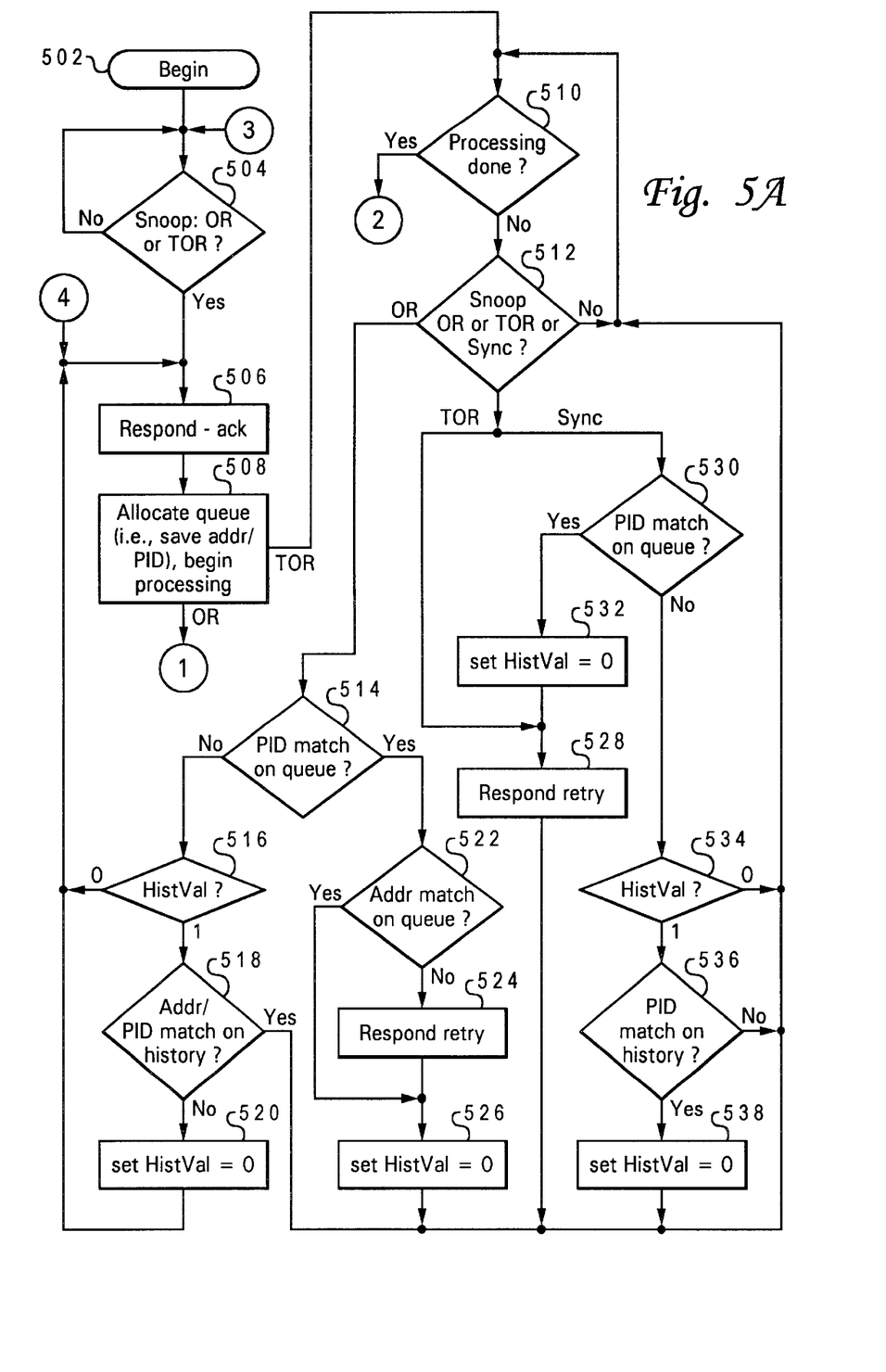
FIGS. 5A–5C depict a high level flow chart for a process within a bus participant of snooping global operations in a system employing a single token limited to one operation in accordance with a preferred embodiment of the present invention.
Figure 5B:
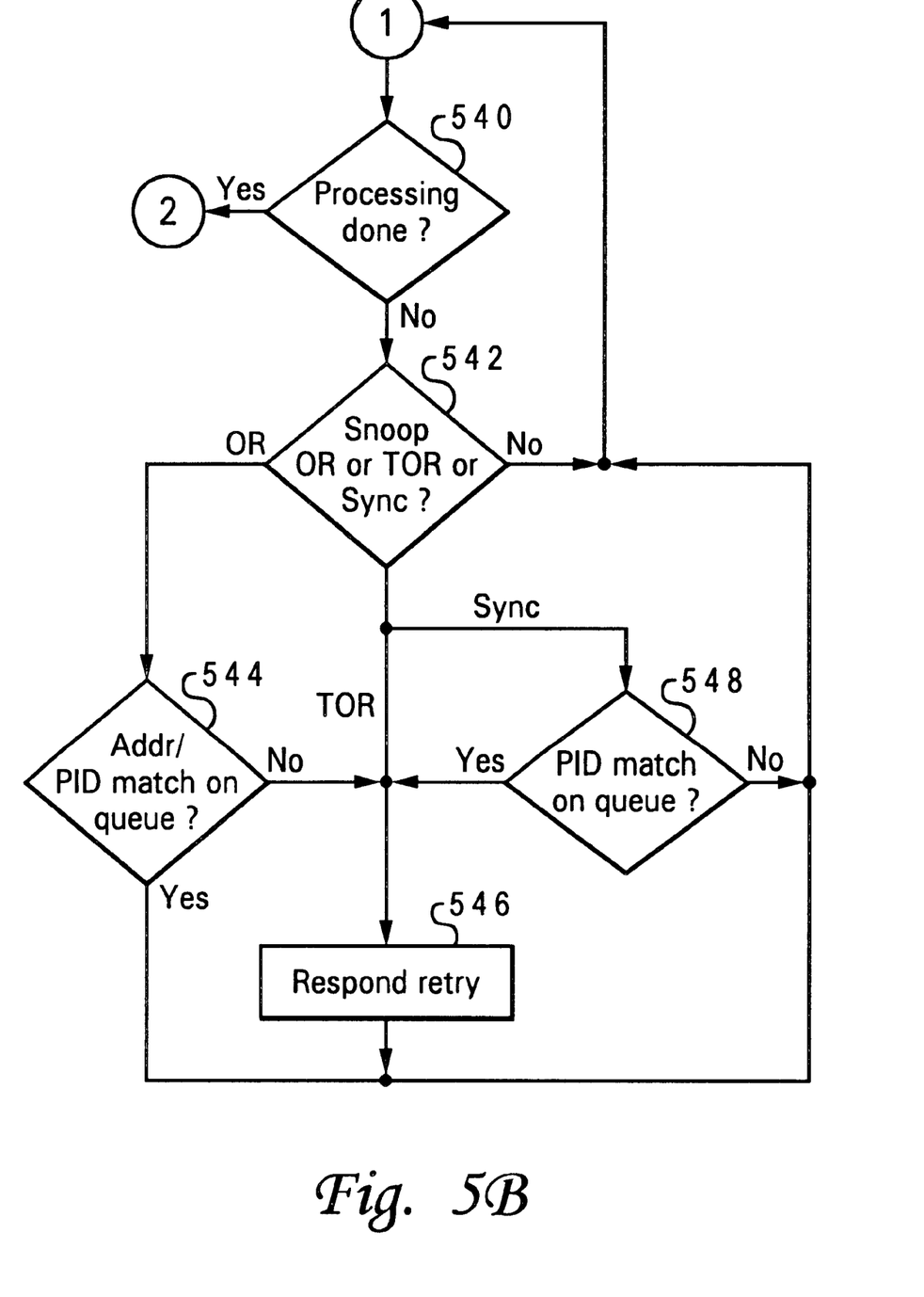
Figure 5C:
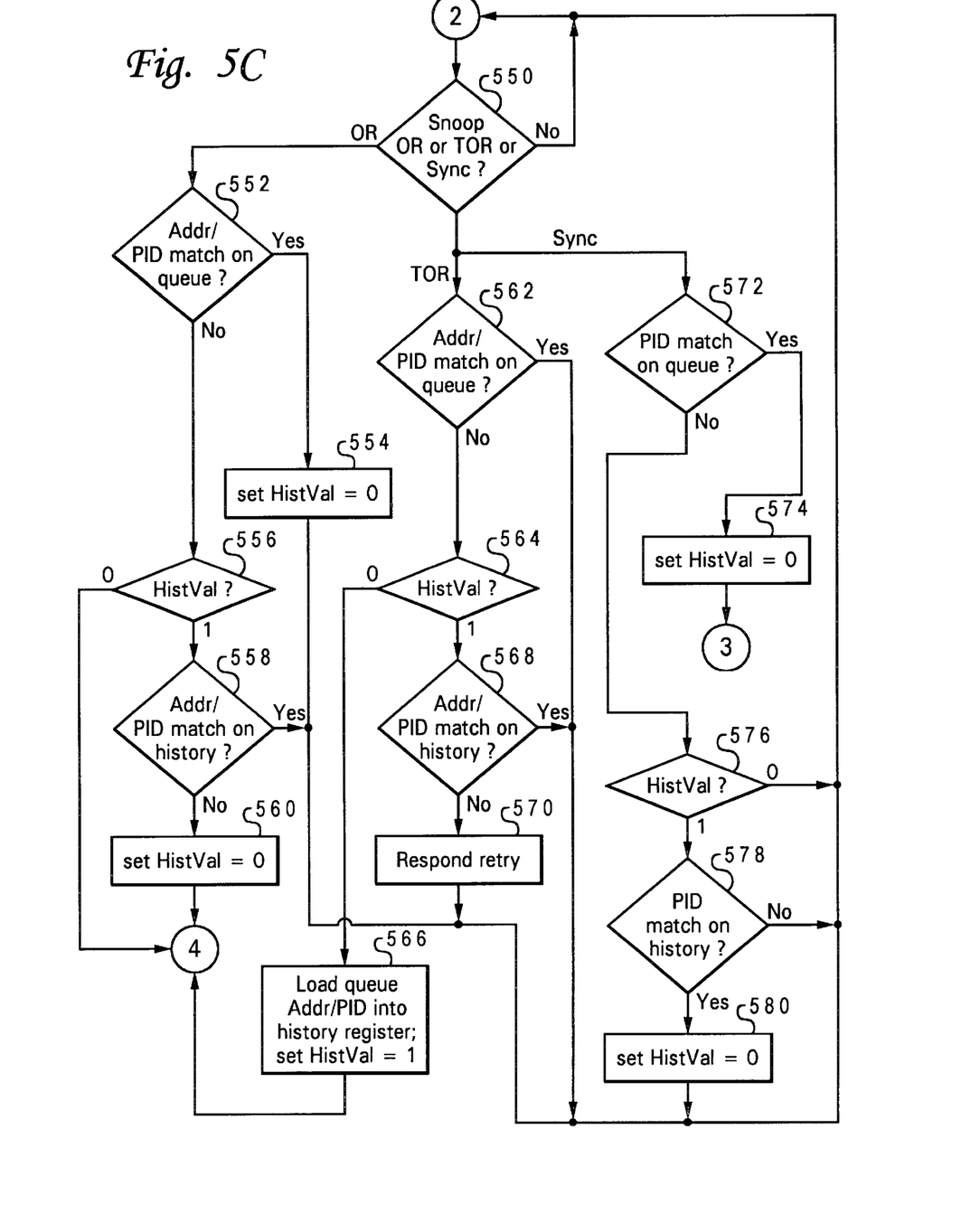

With reference now to FIGS. 5A through 5C, a high level flow chart for a process within a bus participant of snooping global operations in a system employing a single token limited to one operation in accordance with a preferred embodiment of the present invention is depicted. The process begins at step 502, and passes first to step 504, which illustrates a determination of whether an address transaction for an operation request (only) ("OR") or a combined token and operation request ("TOR") has been snooped from a bus (the snooper ignores token-only requests). If not, the process returns to step 504 and continues polling for an address transaction for operation request (only) or a combined token and operation request.

When an address transaction for an operation request (only) or a combined token and operation request is snooped from the bus, the process proceeds from step 504 to step 506, which depicts responding to the snooped address bus transaction with a snoop response of acknowledge, and then to step 508, which illustrates allocating the queue for the snooped operation (which involves saving the address and processor identifier for the snooped operation to the snoop queue) and beginning processing of the snooped operation. If the snooped address transaction is for a operation request (only), the process passes to step 540 depicted in FIG. 5B.

If the snooped address bus transaction is for a combined token and operation request, the process proceeds from step 508 to step 510, which depicts a determination of whether the processing of the operation from the snooped combined token and operation request is completed. If so, the process proceeds to step 550 depicted in FIG. 5C. If not, however, the process proceeds instead to step 512, which illustrates a determination of whether an operation request (only), a new combined token and operation request, or a synchronization ("Sync") request has been snooped from the bus. If not, the process returns to step 510 to continue polling for completion of the global operation from the snooped combined token and operation request and detection of any subsequent global operation.

If an operation request (only) is detected at step 512, the process proceeds instead to step 514, which depicts a determination of whether the processor identifier ("PID") of the processor which sourced the newly-snooped operation matches the processor identifier of the snooped global operation being processed within the snoop queue from the combined token and operation request detected at step 508. If not, the process proceeds to step 516, which illustrates a determination of the value of the "HistVal" flag, a valid flag qualifying the contents of the address and processor identifier history register within the snooper. If the HistVal flag is clear (set to zero), the process returns to step 506 to acknowledge the newly-snooped operation request (only).

If the HistVal flag is set, however, the process proceeds to step 518, which depicts a determination of whether the address ("Addr") and processor identifier for the newly-snooped operation request (only) matches the address and processor identifier stored in the history register. If not, the process proceeds to step 520, which illustrates clearing the HistVal flag, and then returns to step 506. If the address and processor identifier are matched to the history register contents in step 518, the process returns instead to step 510.

When a snooper completes a snoop operation, the snooper saves the address and processor identifier for the completed operation in the history register. This allows the snooper, upon snooping the next combined token and operation request, to begin processing the new operation while continuing to collapse the previous operation (in case the previous operation is still spinning on the bus awaiting an acknowledge combined response). The snooper thus avoids processing the same operation twice in the case where the snooper speculatively completes the first operation, then snoops a second speculative combined token and operation request and completes that operation while the first operation is still spinning on the bus trying to get a null (acknowlege) response. Any snooped operation request (only) with an address and processor identifier match on the (valid) contents of the history register is collapsed (i.e., not retried).

Referring back to step 514, if the processor identifier for the newly-snooped operation request (only) matches that of the snooped operation being process in the snoop queue, the process proceeds instead to step 522, which depicts a determination of whether the address of the newly-snooped operation request (only) matches the address of the snooped operation being processed within the snoop queue. If not, the process proceeds to step 524, which illustrates asserting a retry snoop response. If the addresses match, however, or once the retry snoop response is asserted, the process proceeds to step 526, which depicts clearing the HistVal flag to invalidate the contents of the history register. The process then returns to step 510.

Referring once again to step 512, if a combined token and operation request is snooped (the snooper ignores token-only requests), the process proceeds to step 528, which illustrates asserting a retry snoop response, and then returns to step 510. If a synchronization operation is detected in step 512, the process proceeds instead to step 530, which depicts a determination of whether the processor identifier for the snooped synchronization operation matches the processor identifier for the snooped operation being processed within the snoop queue.

If the processor identifiers for the snooped synchronization operation and the operation being processed in the snoop queue match, the process proceeds to step 532, which illustrates clearing the HistVal flag, and then to step 528. If the processor identifiers for the snooped synchronization operation and the operation being processed in the snoop queue do not match, the process proceeds instead to step 534, which depicts a determination of the state of the HistVal flag. If the HistVal flag is clear, the process returns to step 510. If the HistVal flag is set, the process proceeds instead to step 536, which illustrates a determination of whether the processor identifier for the newly-snooped synchronization operation matches the processor identifier stored within the history register.

If the processor identifier for the newly-snooped synchronization operation does not match the processor identifier stored within the history register, the process merely returns to step 510. However, a snooped synchronization operation with a processor identifier matching the contents of the history register will invalidate the contents of the history register. Therefore, if the processor identifier for the newly-snooped synchronization operation does not match the processor identifier stored within the history register, the process proceeds instead to step 538, which depicts clearing the HistVal flag, and then returns to step 510.

From step 508, when an operation request (only) is detected, the process proceeds to step 540 depicted in FIG. 5B, which illustrates a determination of whether processing of the snooped operation request (only) is completed. If so, the process proceeds to step 550 depicted in FIG. 5C. If processing is not yet complete, however, the process proceeds instead to step 542, which depicts a determination of whether an operation request (only), a combined token and operation request, or a synchronization operation has been detected on the bus by the snooper. If not, the process simply returns to step 540 to continue polling for completion of the operation request (only) and for initiation of other global operations.

If an operation request (only) is detected at step 542, the process proceeds to step 544, which illustrates a determination of whether the address and processor identifier for the new-snooped operation request (only) matches the address and processor identifier for the operation from the operation request (only) detected at step 508 which being processed in the snoop queue. If so, the process merely returns to step 540. If not, however, the process proceeds to step 546, which depicts asserting a retry snoop response, and then returns to step 540.

If a newly-snooped address transaction detected at step 542 is for a combined token and operation request, the process proceeds to step 546, in which a retry snoop response is asserted, and then returns to step 540. If a newly-snooped address transaction detected at step 542 is for a synchronization opaeration, the process proceeds instead to step 548, which illustrates a determination of whether the processor identifier for the newly-snooped address transaction for a synchronization operation matches the processor identifier for the previously detected operation request (only). If so, the process proceeds to step 546, in which a retry snoop response is asserted, and then returns to step 540. If not, the process returns directly to step 540.

Referring back to step 540, once processing of a snooped global operation from an operation request (only) is complete, the process proceeds from step 540 to step 550 depicted in FIG. 5C, which depicts a determination of whether an operation request (only), a combined token and operation request, or a synchronization operation is detected by the snooper while not processing any other global operation. If not, the process simply returns to step 550 to continue polling for a global operation.

If an operation request (only) is detected at step 550, the process proceeds to step 552, which illustrates a determination of whether the address and processor identifier for the detected operation request (only) matches the address and processor identifier for the completed operation. If so, the process proceeds to step 554, which illustrates clearing the HistVal flag, and then returns to step 550. If not, however, the process proceeds to step 556, which depicts a determination of the state of the HistVal flag.

If the HistVal flag is set, the process proceeds to step 558, which illustrates a determination of whether the address and processor identifier for the detected operation request (only) matches the address and processor identifier stored in the history register. If so, the process merely returns to step 550. If not, however, the process proceeds instead to step 560, which depicts clearing the HistVal flag, and then returns to step 506 depicted in FIG. 5A.

The process also returns to step 506 from step 556 if the HistVal flag is determined to be cleared at that step.

If a combined token and operation request is detected at step 550, the process proceeds to step 562, which illustrates a determination of whether the address and processor identifier for the detected combined token and operation request matches the address and processor identifier for the completed operation. If so, the process simply returns to step 550. If not, however, the process proceeds to step 564, which depicts a determination of the state of the HistVal flag. If the HistVal flag is determined to be cleared at step 564, the process proceeds to step 566, which depicts loading the address and processor identifier for the previously completed operation within the queue into the history register and setting the HistVal flag, and then passes to step 506 depicted in FIG. 5A.

If the HistVal flag is set at step 564, the process proceeds instead to step 568, which illustrates a determination of whether the address and processor identifier for the detected combined token and operation request matches the address and processor identifier stored in the history register. If so, the process merely returns to step 550. If not, however, the process proceeds instead to step 570, which depicts asserting a retry snoop response, and then returns to step 550.

If a synchronization operation is detected at step 550, the process proceeds to step 572, which illustrates a determination of whether the processor identifier for the detected synchronization operation matches the processor identifier for the completed operation. If so, the process proceeds to step 574, which illustrates clearing the HistVal flag, and then returns to step 504 depicted in FIG. 5A. If not, however, the process proceeds to step 576, which depicts a determination of the state of the HistVal flag. If the HistVal flag is cleared, the process returns to step 550.

If the HistVal flag is set, the process proceeds to step 578, which illustrates a determination of whether the processor identifier for the detected synchronization operation matches the processor identifier stored in the history register. If not, the process merely returns to step 550. If so, however, the process proceeds instead to step 580, which depicts clearing the HistVal flag, and then returns to step 550.

Figure 6:
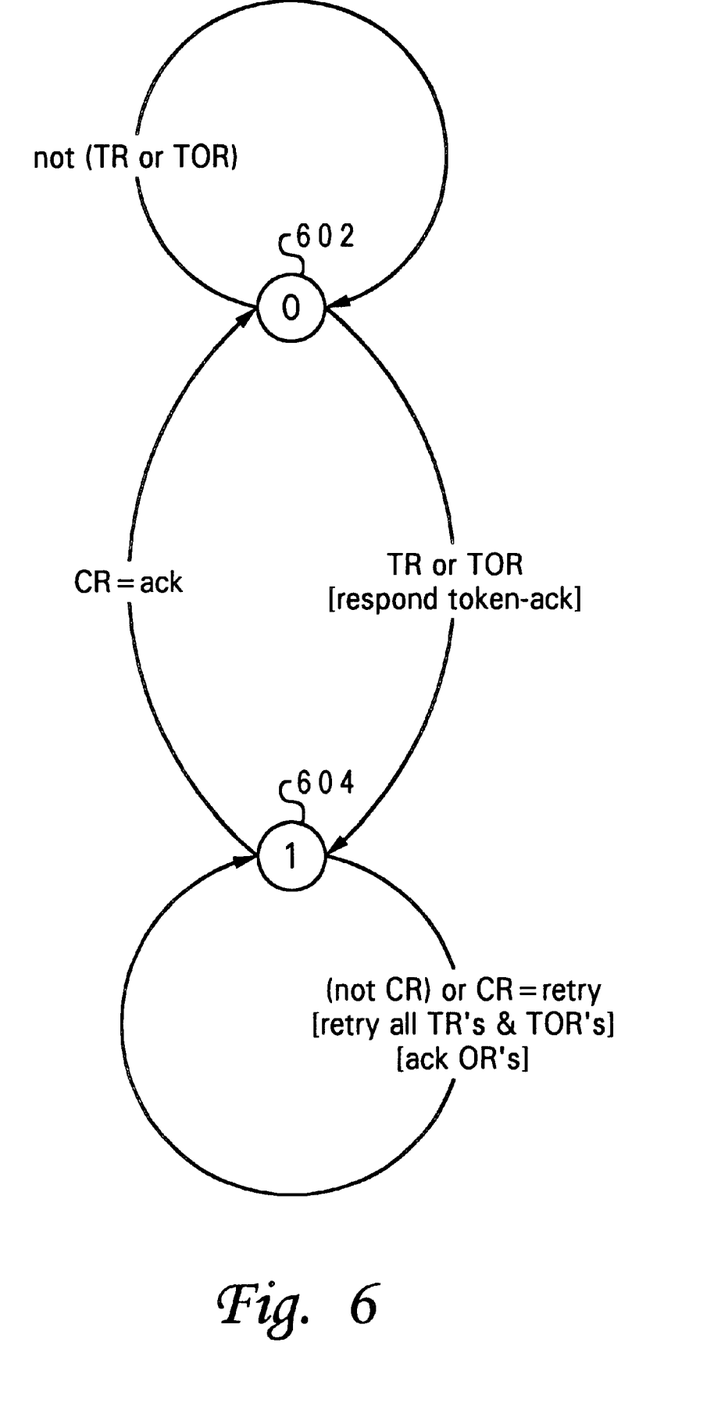
FIG. 6 is a state diagram for token control logic in a system employing a single token for global operation limited to one operation in accordance with a preferred embodiment of the present invention.

Referring to FIG. 6, a state diagram for token control logic in a system employing a single token for global operation limited to one operation in accordance with a preferred embodiment of the present invention is illustrated. The token control logic is typically integrated within the bus arbitration function, to implement a token manager for the sole token. State 602 depicted in FIG. 6 indicates that the token is available, while state 604 indicates that the token is checked out.

The control logic remains in state 602 as long as no token request (only) ("TR") or combined token and operation request ("TOR") is received. The control logic transitions from state 602 when a token request (only) or combined token and operation request is received, with the response acknowledging the token request (only) or acknowledging at least the token request portion of the combined token and operation request.

The control logic remains in state 604 as long as no combined response ("CR"), or a retry combined response, to the token request (only) or the combined token and operation request is received. All token requests (only) and combined token and operation requests detected while the control logic is in state 604 are retried. However, operation requests (only) will be acknowledged while the token control logic is in state 604. The control logic transitions back to state 602 from state 604 when a combined response acknowledging the operation request (only) or acknowledging the operation request portion of the combined token and operation request is received.

The present invention serializes global operations with simplified and reduced hardware, requiring fewer snoop queues for each bus participant. By implementing only a single token, requiring a bus master to request and obtain the token for each individual global operation, and by requiring snoopers to process operation requests (only) even if processing another combined token and operation request must be suspended, the present invention allows release of the token to be implied from a combined response acknowledging the operation request, or acknowledging the operation request portion of a combined token and operation request. Support for combined token and operation requests allows speculative execution of the operation and minimizes overall latency.

While the invention has been particularly shown and described with reference to a preferred embodiment, it will be understood by those skilled in the art that various changes in form and detail may be made therein without departing from the spirit and scope of the invention.

What is claimed is:

1. A method of processing snooped operations in a multiprocessor system, comprising:

responsive to detecting a combined token and operation request including a token portion seeking a token required to complete a global operation and an operation portion designating the global operation to be processed, speculatively processing the global operation;

completing the global operation only upon detecting:
  a combined response to the combined token and operation request acknowledging the entire combined token and operation request, or
  a combined response acknowledging a subsequent operation request by a processor originating the combined token and operation request; and responsive to detecting an operation request from a processor other than the processor originating the combined token and operation request, suspending processing of the global operation and processing a new global operation for the operation request from the other processor.

2. The method of claim 1, wherein the step of completing the global operation further comprises:

saving results of the global operation until a combined response acknowledging the entire combined token and operation request or a combined response acknowledging the subsequent operation request is detected.

3. The method of claim 1, wherein the step of suspending processing of the global operation further comprises:

saving a processing state for the global operation.

4. The method of claim 1, further comprising:

responsive to being busy upon detecting the combined token and operation request, retrying the operation portion.

5. The method of claim 1, further comprising:

responsive to detecting an operation request from the processor originating the combined token and operation request while processing the global operation, collapsing the operation request with the combined token and operation request.

6. The method of claim 1, further comprising:

responsive to detecting an operation request from the processor originating the combined token and operation request after retrying the combined token and operation request, processing a global operation for the operation request if not busy.

7. The method of claim 1, further comprising:

responsive to detecting a combined response acknowledging the subsequent operation request by the processor originating the combined token and operation request, completing the global operation.

8. A system for processing snooped operations in a multiprocessor system, comprising:

a bus master coupled to a bus within the multiprocessor system; and at least one snooper coupled to the bus, wherein the at least one snooper:

responsive to detecting a combined token and operation request including a token portion seeking a token required to complete a global operation and an operation portion designating the global operation to be processed, speculatively processes the global operation;

completes the global operation only upon detecting:

a combined response to the combined token and operation request acknowledging the entire combined token and operation request, or a combined response acknowledging a subsequent operation request by a processor originating the combined token and operation request; and responsive to detecting an operation request from a processor other than the processor originating the combined token and operation request, suspends processing of the global operation and processing a new global operation for the operation request from the other processor.

9. The system of claim 8, wherein the at least one snooper completes the global operation by:

saving results of the global operation until a combined response acknowledging the entire combined token and operation request or a combined response acknowledging the subsequent operation request is detected.

10. The system of claim 8, wherein the at least one snooper suspends processing of the global operation by:

saving a processing state for the global operation.

11. The system of claim 8, wherein the snooper, responsive to being busy upon detecting the combined token and operation request, retries the operation portion.

12. The system of claim 8, wherein the snooper, responsive to detecting an operation request from the processor originating the combined token and operation request while processing the global operation, collapses the operation request with the combined token and operation request.

13. The system of claim 8, wherein the snooper, responsive to detecting an operation request from the processor originating the combined token and operation request after retrying the combined token and operation request, processes a global operation for the operation request if not busy.

14. The system of claim 8, wherein the snooper, responsive to detecting a combined response acknowledging the subsequent operation request by the processor originating the combined token and operation request, completes the global operation.

15. A method of processing snooped operations in a multiprocessor system, comprising:

responsive to detecting both a token request for a token required to complete a global operation and an operation request identifying the global operation to be processed within a single bus transaction, speculatively processing the global operation; and completing the global operation upon detecting:

a combined response to the bus transaction acknowledging both the token request and the operation request, or a combined response to a subsequent bus transaction acknowledging a subsequent operation request by a processor originating the token request and the operation request.

16. The method of claim 15, further comprising:

responsive to detecting a subsequent operation request from a processor other than the processor originating the token request and the operation request, suspending processing of the global operation and processing a new global operation for the subsequent operation request from the other processor.

17. The method of claim 15, further comprising:

responsive to being busy upon detecting the single bus transaction containing the token request and the operation request, driving a retry response to the operation request.

18. The method of claim 15, further comprising:

responsive to being idle upon detecting the single bus transaction containing the token request and the operation request, driving an acknowledge response to the operation request.

19. The method of claim 15, further comprising:

responsive to completing the global operation prior to detecting either a combined response to the bus transaction acknowledging both the token request and the operation request or a combined response to a subsequent bus transaction acknowledging a subsequent operation request by a processor originating the token request and the operation request, saving a result of the global operation in a history register; and responsive to subsequently detecting either a combined response to the bus transaction acknowledging both the token request and the operation request or a combined response to the subsequent bus transaction acknowledging the subsequent operation request, collapsing the subsequent operation request with the global operation.

* * * * *